March 7, 1939. C. O. TODD 2,150,085
LAWN MOWER
Filed Oct. 13, 1938
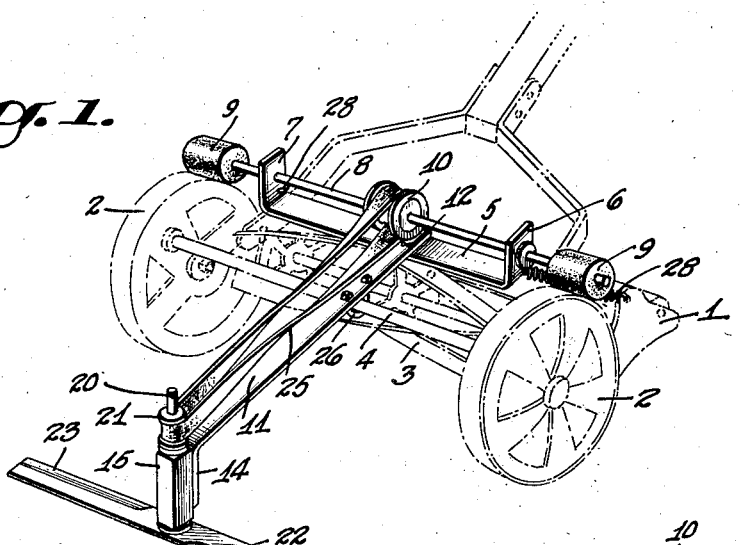
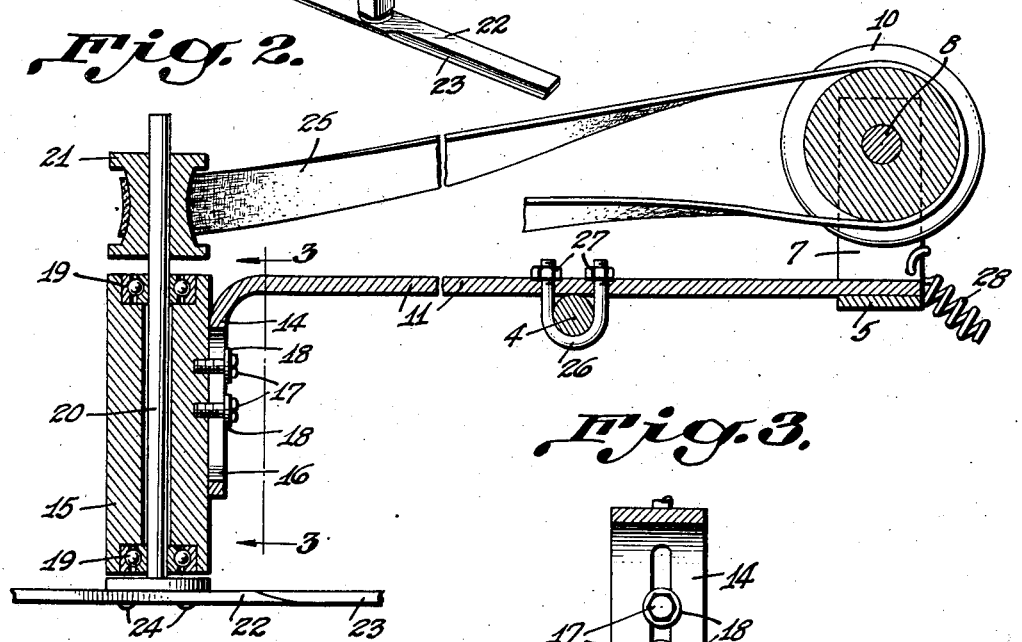
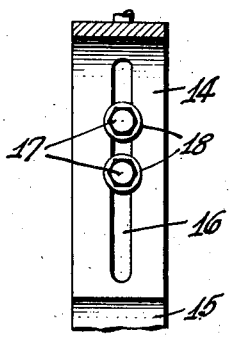
Inventor
Claude O. Todd
By Ben Cohen
Attorney Patented Mar. 7, 1939

2,150,085

UNITED STATES PATENT OFFICE 2,150,085

LAWN MOWER

Claude O. Todd, Washington, D. C.

Application October 13, 1938, Serial No. 234,818

5 Claims. (Cl. 56—238)

This invention relates to lawn mowers and more particularly to a cutting attachment for lawn mowers for cutting tall grass and weeds in advance of the cutting operation of the mower, both cutting operations being performed by a single movement of the mower.

The primary defect in the conventional lawn mowers of the rotary blade or reel type, results from the inability of the mower to cut long stemmed grass, weeds, etc., such tall growths being bent over or knocked down by the cutting reel without being brought between the blade and the ledger plate. Thus when cutting tall grass, the lower only partly performs its function and leaves the lawn in an unsightly condition. Tall grass also clogs the driving means for the cutting reel and impairs rapid cutting of the lawn. The field of utility of this type of mower is thus more or less limited to the cutting of relatively short grass. The same results occur to a lesser degree when the grass is relatively short except for certain growths, such as weeds which have grown up to a height approximately equal to the distance of the reel axis above the ground, these tall weeds or the like remaining uncut by the mower.

Thus, the primary object of the present invention is to overcome these and other difficulties encountered in this type of mower by providing for the cutting of two swaths, one above the other, the first being at the proper level to cut the tall gross to a level low enough to permit the second to reduce all of the grass to the same height so as to leave the lawn in a neat and smooth condition after having been gone over only once by the mower.

A further object of the present invention is to provide a cutter attachment for lawn mowers which is relatively simple in construction and can be attached or detached without making any change whatsoever in the lawn mower, and which will automatically set itself, upon being attached, in efficient cutting position.

A still further object of the invention is to provide an efficient cutting attachment having few parts and which is inexpensive to manufacture, thus bringing it within the price range of the ordinary man.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a perspective view of an attachment embodying the principles of the invention as applied to a known form of lawn mower, the mower being shown in dotted lines;

Figure 2 is a vertical cross-sectional view of the cutting attachment; and

Figure 3 is a sectional view taken on the line 3—3 of Figure 2 to illustrate the vertical adjusting means for the cutter.

Referring to Figure 1, an improved cutting attachment embodying one form of the invention is shown mounted on a lawn mower of the revolvable blade or reel type. The mower may be of any suitable construction, the one shown in dotted lines in Figure 1 having a frame 1 provided with a pair of spaced traction wheels 2, a cutting reel 3 and the conventional front bar or tie rod 4.

The cutting attachment consists of a yoke member 5 having upstanding arms 6 and 7 through which a shaft 8 is journalled. Friction wheels 9 are mounted on both ends of the shaft 8 and are adapted to bear on the upper portions of the wheels 2 of the lawn mower for a purpose to be described. The wheels are preferably constructed of hard rubber, but may be made of any material, and are of a diameter approximately one fifth the diameter of the mower wheels 2. Rigidly mounted centrally of the shaft 8 so as to rotate therewith is the pulley 10.

A supporting bar 11 is rigidly connected to yoke 5, at 12, and extends forwardly therefrom. Bar 11 has a downwardly extending portion 14, on which a shaft support 15 is adjustably mounted.

Referring to Figures 2 and 3, the adjustable means comprises a slotted portion 16 arranged vertically in member 14. Threaded bolts 17 and washers 18 connect shaft support 15 to bar 14. Loosening of bolts 17 permits vertical adjustment of support 15.

The shaft support 15 includes bearing supports 19 at the upper and lower ends thereof to permit free rotation of a vertical shaft 20. The vertical shaft 20 has a pulley 21 rigidly attached to the upper end thereof and a cutter blade 22 at its lower end. The pulley 21 has a diameter slightly less than one half the diameter of pulley 10. The cutter blade may be detachably secured to shaft 20 by means of screws 24, although any detachable means may be used. The cutter blade is sharpened at opposite edges as seen at 23 in Figure 1, and in operation simulates a rotating fan with the sharp edges striking the grass or weeds to be severed.

A belt 25 operatively connects pulley 10 with pulley 21 whereby rotation of shaft 8 will cause rotation of shaft 20 to operate cutter 22. Although the belt 25 has been shown as a flat belt, any shape of belt can be used.

Means is provided for attaching the cutter attachment to the conventional lawn mower. This means comprises a threaded U-bolt 26 and nuts 27, the U-bolt being adapted to fit around the tie rod 4 of the mower. The construction disclosed permits of ready attachment and detachment of the cutter. However, any readily detachable securing means may be used without departing from the spirit of the invention.

Means are also provided for positively holding the engaging members 9 in frictional engagement with the mower wheels 2 and consists of spring members 28 between the yoke 5 and the frame 1. Although the holding means are shown in the form of springs, weights or equivalent means may be used in place of said springs.

From the above description it will be seen that the auxiliary cutter is in the form of an attachment which may be connected to the mower or removed therefrom as desired. To mount the attachment on the mower, bar 11 is placed so as to rest on rod 4 of the mower, with members 9 resting on the rear portion of wheels 2 as seen in Figure 1. The bar 11 is then bolted to rod 4 by means of the U-bolt 26 and springs 28 connected to frame 1. When so assembled, the device is ready for use. During the normal operation of the mower, wheels 2 rotate, thus rotating shaft 8 through bearing members 9. The movement of shaft 8 is transmitted to shaft 20 through pulley belt 25 causing the blade 22 to rotate in a horizontal plane to cut the grass in advance of mower reel 3. When both cutter and reel are operated, the assembly cuts two swaths, one above the other and effectively cuts tall grass and weeds. The attachment thus materially increases the utility of the mower.

It is readily apparent that in order to obtain the maximum efficiency for the cutter attachment, the blade should rotate at a high rate of speed. Experimentation has shown that a rate of speed of twelve revolutions for every revolution of the mower wheels 2 will produce maximum efficiency. As pointed out in the specification, the diameter of wheel 2 is approximately five times the diameter of wheel 9, thus producing five revolutions of shaft 8 for every revolution of wheel 2. Pulley 10, on the other hand, has a diameter of a little more than twice the diameter of pulley 21, thus producing about two and one half revolutions of pulley 21 for every revolution of pulley 10. Thus it is readily seen that for every revolution of the mower wheel, the blade revolves approximately twelve times. With the present construction, therefore, the rate of speed of the cutting blade may be varied by merely varying the relative proportions of wheels 9 and pulleys 10 and 21.

While only one embodiment of the invention has been shown and described herein, it is obvious that many changes may be made without departing from the spirit of the invention or the scope of the annexed claims. For example, two cutter blades instead of one may be used by merely providing shaft 8 wtih two pulleys similar to 10 and connecting a cutter blade to each of the pulleys in the same manner as now shown in connection with a single blade. It is also to be understood that the present attachment may be used with a power mower instead of the hand mower disclosed herein without departing from the spirit of the invention. Although not disclosed in the drawing, a protective guard may be provided to surround the cutter blade to eliminate any possibility of contact with the person. The guard may take any form desired.

Thus it will be seen that the constructions herein shown and described are well adapted to accomplish the objects of the present invention. It will be understood, however, that the invention may be embodied otherwise than here shown and that in the embodiments illustrated, certain changes in the construction may be made. Therefore, I do not wish to be limited precisely to the construction herein shown except as may be required by the appended claims considered with reference to the prior art.

Having thus described the invention, what is claimed is:

1. An attachment for lawn mowers comprising supporting means, a shaft rotatably mounted at one end of said supporting means, said shaft having engaging portions at each end thereof, rotary cutting means mounted at the opposite end of said supporting means and rotating in a substantially horizontal plane when said attachment is mounted on a lawn mower, rotary transmitting means for connecting the rotary cutting means with the rotatable shaft, and means for attaching said attachment to a lawn mower.

2. An attachment for lawn mowers comprising supporting means, a yoke mounted at one end thereof, a shaft rotatably mounted in said yoke, engaging means on the ends of said shaft, a pulley mounted on said shaft, a second shaft mounted at the opposite end of said supporting means, said second shaft having a rotary cutting means at one end thereof and a pulley at the other end thereof and rotating in a substantially horizontal plane when said attachment is mounted on a lawn mower, and a belt connecting the two pulleys.

3. An attachment for lawn mowers comprising supporting means, a rotatable shaft mounted at one end of said supporting means, engaging means on the ends of said shaft and adapted to bear on the wheels of a lawn mower for rotation thereby, a second shaft rotatably mounted at the opposite end of the supporting means, rotary cutting means at the lower end of said second shaft and rotating in a substantially horizontal plane when said attachment is mounted on a lawn mower and rotary transmitting means connecting the two shafts whereby rotation of the first shaft will operate the second shaft.

4. An attachment for lawn mowers comprising supporting means, a shaft rotatably mounted at one end of said supporting means, said shaft having engaging means at each end thereof, a pulley mounted substantially centrally of said shaft, a second shaft rotatably mounted at the opposite end of the supporting means, rotary cutting means at the lower end of said second shaft and rotating in a substantially horizontal plane when said attachment is mounted on a lawn mower and a pulley at the opposite end thereof, and a belt connecting the two pulleys.

5. In combination with a mower having wheels thereon, a cutting attachment comprising a frame detachably mounted on said mower, said frame having horizontal rotary cutting means mounted at the front thereof rotating in a horizontal plane, a horizontal shaft mounted at the rear portion of the frame and having engaging means at its ends bearing on the mower wheels, and rotary transmitting means connecting the shaft and cutting means whereby movement of the mower wheels will rotate the cutting means.

CLAUDE O. TODD.